United States Patent [19]

Rusch

[11] 4,017,822
[45] Apr. 12, 1977

[54] BEARING DETERMINING APPARATUS INCLUDING SINGLE CHANNEL MULTIPLEXING

[75] Inventor: William T. Rusch, Hollis, N.H.

[73] Assignee: The United States of America as represented by the Secretary of the Navy, Washington, D.C.

[22] Filed: Nov. 24, 1969

[21] Appl. No.: 886,602

[52] U.S. Cl. .................................. 340/2; 340/6 R
[51] Int. Cl.² .......................................... G01S 3/80
[58] Field of Search .............. 340/2, 3 R, 6 R, 16 R

[56] References Cited

UNITED STATES PATENTS

| 3,176,262 | 3/1965 | Ehrlich et al. ..................... 340/6 X |
| 3,444,508 | 5/1969 | Granfors et al. ...................... 340/2 |

*Primary Examiner*—Richard A. Farley
*Attorney, Agent, or Firm*—Edgar J. Brower; Henry Hansen; B. F. Buchan, Jr.

[57] ABSTRACT

Apparatus for determining the bearing of a remotely located source of an impinging acoustic signal including a sonobuoy having a submerged package including a hydrophone array for producing omnidirectional and orthogonal directional signals, a combiner for combining the directional signals, and a single channel multiplexer including modulators and a compass driven resolver for providing a single channel multiplexer output signal carrying bearing information in a single frequency channel via a cable to a transmitter unit carried by a surface package of the sonobuoy. The transmitter unit transmits the single channel multiplexed information to a receiver whose output signal is applied to a demultiplexer for deriving a pair of phase shifted signals indicative of the omnidirectional acoustic signal received which pair have a relative phase shift equivalent to the bearing angle referenced to magnetic North. The pair of signals from the demultiplexer are fed to a processor which produces an output signal indicative of the bearing angle for driving a display.

10 Claims, 2 Drawing Figures

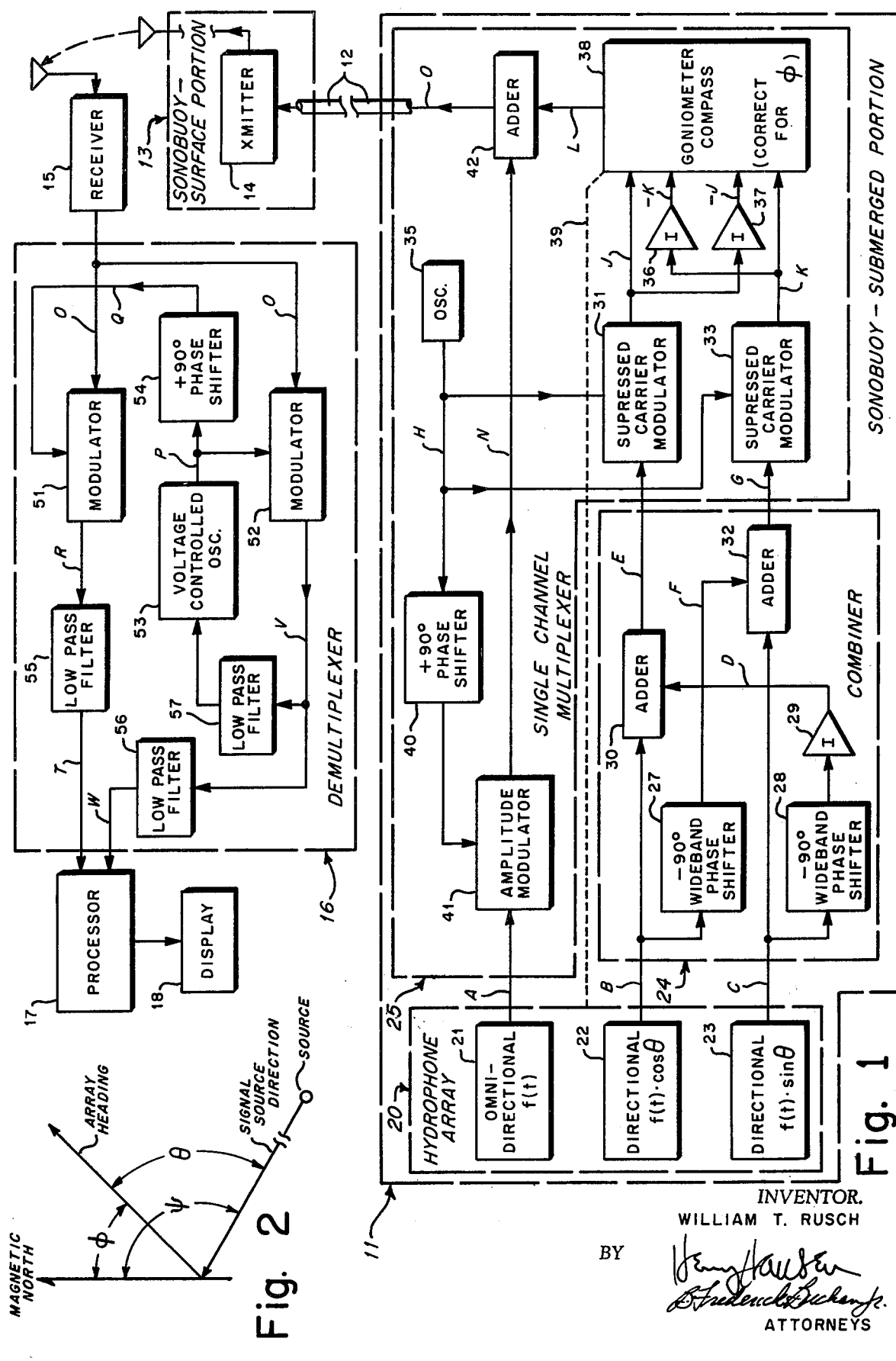

4,017,822

BEARING DETERMINING APPARATUS INCLUDING SINGLE CHANNEL MULTIPLEXING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention generally relates to apparatus for determining the direction of a remotely located signal source and, more particularly, to apparatus including underwater sensors for determining the bearing of a remotely located source of acoustic signals.

The tracking of submarines and the like as by sensing acoustic signals of characteristic frequencies emanating from the submarine and determining bearing of the submarine with sonobuoys involves positioning of a hydrophone array at some depth beneath the ocean surface. In direction determining apparatus of the type including an omnidirectional hydrophone and a pair of orthogonally mounted directional hydrophones whose output signals are processed as by comparing the phase of a combination of the directional signals with the phase of the omnidirectional signal, it is critical that the channels carrying the omnidirectional and directional signals to a surface located transmitter be exactly matched in phase shift characteristics. At depths of several tens of feet, the problems in maintaining precise phase shift characteristics are considerable.

SUMMARY OF THE INVENTION

It is the general purpose of this invention to provide an improved passive apparatus for determining the bearing of a remotely located acoustic signal source wherein the problems of the prior art are avoided and wherein the requirement for precise matching of phase shift characteristics in plural channels is eliminated. It is a further purpose of the invention that an improved direction finding apparatus be provided which is adapted to provide bearing indication referenced to magnetic north. Briefly, the general purpose of the invention is accomplished by utilizing a single channel multiplexing scheme whereby the information needed for determining bearing is transmitted in a single frequency channel from a submerged package including the hydrophone array to a surface located package for transmission to a receiver and a processor including a demultiplexer. More particularly, the invention contemplates apparatus wherein the directional hydrophone output signals are combined and are applied to a multiplexer for correction for deviation of the hydrophone array heading from magnetic north and for multiplexing with the output signal of the omnidirectional hydrophone in order to provide a single frequency channel signal carrying all necessary information for obtaining the bearing angle. Still more particularly, the invention comprehends a system wherein the omnidirectional hydrophone output signal is amplitude modulated and the directional signals are combined to provide a pair of phase shifted signals applied to modulate a carrier so that any phase shifts experienced by sidebands of the omnidirectional signal also will be experienced by the corresponding sideband spectra of the phase shifted signal resulting from a phase correction of the combination of the directional signals for deviation of the heating of the hydrophone array from magnetic north. It is further contemplated that the omnidirectional signal and the phase shifted combination signal be superimposed on quadrature components of the carrier signal for ease of separation by a demultiplexer. Still more particularly, the invention contemplates apparatus wherein the directional signals are combined and modulated in suppressed carrier modulators providing output signals suitable for application to a compass driven resolver whose output signal comprises a phase shifted version of the omnidirectional signal superimposed in quadrature with the omnidirectional signal on the carrier signal.

BRIEF DESCRIPTION OF THE DRAWING

FIG. 1 represents a block diagram of apparatus according to the invention; and

FIG. 2 represents a diagram of the angular relationship between magnetic north, a hydrophone array heading, and the direction of a remote source of acoustic signals sensed by the apparatus of FIG. 1.

DESCRIPTION OF THE PREFERRED EMBODIMENT

Generally, the apparatus of FIG. 1 includes a sonobuoy having a submerged package 11 for sensing impinging acoustic signals and developing a single frequency channel signal which is supplied via a signal cable 12 to a surface portion 13 such as a float (not shown) carrying a transmitter 14. The transmitter 14 transmits the information derived by the submerged portion 11 to a remotely located receiver 15 which may be carried in a ship or aircraft, and whose output signal is demultiplexed by a demultiplexer 14 and applied to a processor 17 which produces an output signal indicative of the bearing angle $\Psi$ of the source of the sensed acoustic signal relative to magnetic north, in turn, applied to a utilization device such as a display 18.

More particularly, the submerged portion 11 of the sonobuoy includes a hydrophone array 20 having arranged in fixed relation an omnidirectional hydrophone 21 and a pair of matched directional hydrophones 22 and 23 having orthogonally oriented patterns of sensitivity. All of the hydrophones 21, 22 and 23 have similar attenuation and phase shift characteristics. The directional hydrophones 22 and 23 have patterns of sensitivity which may vary as a function of the angle $\theta$ between the array heading and the direction of a remotely located source of an impinging acoustic signal as indicated in the diagram of FIG. 2. Arbitrarily selecting the direction of the array heading as being aligned with the direction of maximum sensitivity for the hydrophone 22, the output signals of the directional hydrophones 22 and 23 vary as functions respectively of the cosine and sine of the angle $\theta$, the output signal of hydrophone 23, in effect, lagging that of hydrophone 22 by 90°. In order to simplify description of the apparatus, let one frequency component $\cos\omega_n t$ of a received signal $f(t)$ be traced through the apparatus. The output signal A of the omnidirectional hydrophone 21 may be represented as follows:

$$A = S_n \cos\omega_n t$$

where $S_n$ equals the amplitude of the frequency component being traced and $\omega_n$ equals the angular frequency of the component. Similarly, the output signals B and C of the directional hydrophones 22 and 23 may be represented as follows:

$$B = S_n \cos\omega_n t \cdot \cos\theta$$

and $$C = S_n \cos\omega_n t \cdot \sin\theta.$$

Since the hydrophone array 20 is suspended below the surface portion 13 as by the cable 12 or a suspension cable (not shown), it is improbable that the orientation of the array relative to magnetic north will remain fixed. In general, the deviation $\phi$ of the array heading from magnetic north shown in FIG. 2 will be corrected as hereinafter shown by a compass driven resolver. While the bearing may be corrected to true north, the bearing $\Psi$ to be ascertained by the apparatus of FIG. 1 is the angular deviation of the direction of the acoustic signal source measured from magnetic north.

In general, the directional output signals B and C of the hydrophone array are applied to a combiner 24 whose output signals are applied along with the omnidirectional hydrophone output signal A to a single channel multiplexer 25 in order to produce a signal which contains all of the essential information from which may be derived the bearing angle $\Psi$ relative to magnetic north and which is in a form suitable for transmission along a single frequency channel. In operation, the output signals of the directional hydrophones 22 and 23 are combined to produce at least one combination signal having a phase shift relative to the output signal of the omnidirectional hydrophone of magnitude corresponding to the angle $\theta$ between the array heading and the direction to the source. The combination signals and the omnidirectional signal are modulated on respective quadrature components of a carrier. The modulated combination signals are provided in quadrature form to a compass driven resolver for introducing into its output signal an additional phase shift corresponding to the angle of displacement $\phi$ of the array heading from magnetic north. Since the compass driven resolver output signal and the omnidirectional signal are carried on quadrature components of the carrier, they may be added to form a signal which may be transmitted from the submerged sonobuoy portion 11 via a single frequency channel to the remotely located receiver 15 and applied to the demultiplexer 16 for recovering a pair of signals displaced in phase in an amount equal to the bearing angle which signals may be resolved into sine and cosine functions of the bearing and applied to the processor 17 for computation and generation of a signal indicative of the bearing angle $\Psi$. The bearing angle thereby may be displayed or otherwise utilized in tracking the source of the characteristic acoustic signals received.

More particularly, the directional output signals B and C are applied to the combiner 24 to produce a pair of signals separated 90° in phase and each having a phase shift relative to the omnidirectional signal A of a magnitude indicative of $\theta$, the deviation of the direction of the signal source from the array heading. The pair of signals enable the compass driven resolver to correct for the angular deviation $\phi$ of the array heading from the magnetic north by providing an output signal having a phase shift relative to the omnidirectional signal of magnitude equal to the sum of $\phi$ and $\theta$, in turn, equal to $\Psi$. The combiner 24 includes a pair of minus 90° wideband phase shifters 27 and 28 of sufficient bandwidth to accommodate signals of all the frequencies in the particular acoustic band of interest. The output signals of the phase shifter 28 is applied through an inverting amplifier 29 to provide the signal $$D = -S_n \sin\omega_n t \cdot \sin\theta$$

to an analog signal adding device or adder 30 which is also connected to receive the output signal B from the directional hydrophone 22. The adder 30 provides the output signal $$E = S_n \cos(\omega_n t + \theta)$$

to a suppressed carrier modulator 31. The wideband phase shifter 27 provides the output signal $$F = S_n \sin\omega_n t \cdot \cos\theta$$

to another analog adder 32 which is connected to receive the output signal C from the directional hydrophone 23. The adder 32 provides the other combiner output signal $$G = S_n \sin(\omega_n t + \theta)$$

which is applied to another suppressed carrier modulator 30.

The multiplexer 25 also includes a fixed oscillator 35 which supplies a carrier output signal $$H = \sin\omega_o t$$

to the modulators 31 and 33 which respectively provide the output signals $$J = S_n \cos(\omega_n t + \theta) \cdot \sin\omega_o t.$$

and $$K = S_n \sin(\omega_n t + \theta) \cdot \sin\omega_o t$$

The signals J and K are each additionally applied to respective inverting amplifiers 36 and 37. Thereby, the modulators 31 and 33 together with the inverting amplifiers 36 and 37 provide reference signals including the angle $\theta$ as a phase shift which are in quadrature form. i.e., four similar signals successively displaced 90° in phase, and which are suitable for driving a compass driven resolver such as a goniometer compass 38 of the type disclosed in U.S. Pat. No. 3,264,554 to Hayner et al issued Aug. 2, 1966. The quadrature reference signals J, −K, −J, and K are each applied to respective ones of the four quadrant plates (not shown) of the casing of the compass 38. The casing (not shown) as indicated by the dashed line 39 interconnecting the compass 38 and the array 20 is mechanically rigidly fixed relative to the hydrophone array 20. The cardioid-shaped pickup (not shown) driven by rotor shaft carried magnets (not shown) of the compass 38 picks up the reference signal by capacitive coupling and effects a phase displacement corresponding to the degree of rotation of the compass rotor shaft relative to the compass casing, i.e., the angle $\phi$. Thereby, the compass 38 provides the output signal $$L = S_n \sin\omega_o t \cdot \cos(\omega_n t + \theta + \phi) = S_n \sin\omega_o t \cdot \cos(\omega_n t + \Psi).$$

The output signal H of the fixed oscillator 35 is also applied to a plus 90° phase shifter 40 in order to provide the output signal $$M = \cos\omega_o t$$

which is applied as a carrier to an amplitude modulator 41 connected to receive the output signal A of the omnidirectional hydrophone 21. The amplitude modulator thereby provides an output signal $$N = \cos\omega_o t \, [1 + S_n \cos\omega_n t]$$

which is applied to an analog adder 42 along with the signal L from the compass 38. The adder 42 provides the output signal $$O = \cos\omega_o t + S_n \, [\cos\omega_o t \cdot \cos\omega_n t + \sin\omega_o t \cdot \cos(\omega_n t + \Psi)]$$

wherein the omnidirectional signal and the signal containing the bearing angle information are on quadrature components of the carrier. The signal O is applied through the signal cable 12 to the transmitter 14 for transmission to the receiver 15 which includes means for recovering the signal O and applying it to the demultiplexer 16. The demultiplexer 16 includes a pair of modulators 51 and 52 connected to receive the signal O and a voltage controlled oscillator 53 which provides an output signal $$P = \sin\omega_o t.$$

The signal P is applied to the modulator 52 for cross multiplication with the signal O and is applied through a plus 90° phase shifter 54 providing the output signal $$Q = \cos\omega_o t$$

to the modulator 51 for cross multiplication with the signal O. The modulator 51 provides the output signal $$R = \cos^2\omega_o t [1 + S_n \cos\omega_n t] + \tfrac{1}{2}\sin 2\omega_o t \cdot S_n \cos(\omega_n t + \Psi)$$

which is applied through a low-pass filter 55 to provide a demultiplexer output signal $$T = S_n \cos\omega_n t$$

indicative of the omnidirectional signal A. Similarly, the modulator 52 provides the output signal $$V = \tfrac{1}{2} \sin 2\omega_o t [1 + S_n \cos\omega_n t] + S_n \sin^2\omega_o t \cdot \cos(\omega_n t + \Psi)$$

to a low-pass filter 56 which provides another demultiplexer output signal $$W = S_n \cos(\omega_n t + \Psi)$$

containing the bearing angle as a phase shift. In order to precisely set the voltage controlled oscillator 53 to the carrier frequency, the d.c. component of the output signal V of the modulator 52 is extracted by a low-pass filter 57 and applied as an error signal to the voltage controlled oscillator 53.

The demultiplexer output signals W and T are applied to the processor 17 which derives the bearing angle $\Psi$. For example, the processor 17 may include a resolver (not shown) for producing signals indicative of respectively the sine and cosine of the bearing angle applied to a computer (not shown) which derives their quotient and ascertains which angle has tangent equal to the quotient. A suitable resolver may include a pair of phase detectors (not shown) receiving the output signals T and W. Cross-multiplication of the signals W and T as by a modulator provides:

$$WT = S_n^2 \, (\cos^2\omega_n t \cdot \cos\Psi - \tfrac{1}{2}\sin 2\omega_n t \cdot \sin\Psi)$$

from which a first resolver output signal $$X = S_n^2 \cos\Psi$$

may be extracted by low-pass filtering. Applying the signal T to a minus 90° phase shifter yields a signal $$Y = S_n \sin\omega_n t$$

which may be cross-multiplied with signal W as in a modulator to yield $$WX = S_n^2 \, (\sin^2\omega_n t \cdot \sin\Psi + \tfrac{1}{2}\sin 2\omega_n t \cdot \cos\Psi)$$

from which may be extracted as by low-pass filtering the second resolver output signal $$Z = S_n^2 \sin\Psi$$

which is applied to a bearing angle computer (not shown) for the computation of $\sin\Psi/\cos\Psi$ to obtain $\tan\Psi$ enabling production of the output signal indicative of $\Psi$ applied to the display 18.

Any phase shift imposed upon the sidebands of the omnidirectional signal during transmission via the signal cable 12 will be equalled by equivalent phase shifts of equal frequency components of the upper and lower sidebands of the signal L carrying the bearing angle information. Thereby, more accurate apparatus is provided in that the relative phase displacement of the signal carrying the bearing angle information is preserved relative to the omnidirectional signal. All of the information from the lower unit 11 is combined so that it can be sent to the upper unit 13 in only one frequency channel instead of using plural frequency channels. The invention eliminates the necessity of adjusting the receiver 15, demultiplexer 16 and processor 17 to match each of the several sonobuoys which may transmit information thereto. Phase problems caused by cable characteristics, filters, transmitter, receiver, and anything beyond the adder 42 in the submerged portion 11 of the sonobuoy are virtually eliminated.

It is contemplated, of course, that the demultiplexer output signals T and W could be time compressed in the input stage of the processor 17 as by applying each of the signals T and W through a hard limiter and to time compression units such as of the delay line time compression type whose compressed output signals are applied through narrow-band filters to the resolver producing the signals such as X and Z. Active shifter networks can be utilized, and the hydrophone output signals may be upshifted in frequency prior to the imposition of 90° phase shifts by the phase shifters 27 and 28 in order to reduce the size of the parts.

Obviously, many modifications and variations of the present invention are possible in view of the above teachings. It is therefore to be understood that within the scope of the appended claims the invention may be practiced otherwise than as specifically described.

What is claimed is:

1. In a system for determining the bearing of a remotely located acoustic signal source, apparatus comprising:
   a surface sonobuoy portion;
   a submergible sonobuoy portion including a hydrophone array having fixed together an omnidirectional hydrophone and a pair of directional hydrophones having orthogonally arranged patterns of sensitivity fixed relative to an array heading, each said hydrophone providing a hydrophone output signal;
   said submergible portion further including a combiner means connected to receive said directional hydrophone output signals for providing at least one combiner output signal which is displaced in phase from said omnidirectional hydrophone output signal by an amount indicative of the angular displacement of said array heading from the direction of the signal source;
   said submergible sonobuoy portion further including multiplexer means for impressing said omnidirectional signal and said combiner output signal on respective quadrature components of a carrier to provide a multiplexer output signal carrying bearing information which is suitable for transmission along a single frequency channel; and
   signal cable means connected between said multiplexer means and said surface sonobuoy portion for carrying said multiplexer output signal in one frequency channel to said sonobuoy surface portion.

2. Apparatus according to claim 1 further comprising:
   said surface sonobuoy portion including transmitter means connected to receive said multiplexer signal for transmitting said multiplexer output signal;
   receiver means for providing an output signal indicative of said multiplexer signal;
   demultiplexer means connected to receive said multiplexer signal for providing a pair of demultiplexer output signals separated in phase a degree indicative of the bearing of the signal source; and
   processor means for deriving from said demultiplexer signals a signal indicative of the bearing of the signal source.

3. Apparatus according to claim 1 wherein said multiplexer means further comprises:
   means providing said quadrature components of said carrier signal;
   amplitude modulator means for impressing said omnidirectional hydrophone output signal on one of said quadrature components for providing an amplitude modulator component output signal;
   first suppressed carrier modulator means for impressing said combiner output signal in the other said quadrature components for providing a first phase displaced modulated component output signal; and
   first adder means for combining said amplitude modulated and said phase displaced modulated component output signal for providing said multiplexer output signal.

4. Apparatus according to claim 3 wherein said multiplexer means further comprises:
   compass driven resolver means mechanically connected to said hydrophone array and electrically connected for receiving said first phase displaced modulated component output signal for introducing relative to said omnidirectional signal a further phase shift corresponding to the angular displacement of said array heading from magnetic north and providing a further phase displaced resolver output signal to said analog adder means for combination with said amplitude modulated component output signal.

5. Apparatus according to claim 4 further comprising:
   means for providing said phase displaced modulated component output signal to said compass driven resolver means in quadrature form.

6. Apparatus according to claim 4 further comprising:
   said directional hydrophones providing said directional hydrophone output signals varying as functions of respectively the cosine and the sine of the angular deviation between said array heading and the direction of the signal source;
   said combiner means including first and second phase shifting means each for introducing a minus 90-degree phase shift into a respective one of said directional hydrophone output signals;
   said combiner means further including second and third adder means each for receiving and adding said output signal of a respective one of said directional hydrophone and the phase shifted directional output signal of the other of said directional hydrophone for providing respectively a first combiner output signal applied to said first suppressed carrier modulator means shifted in phase in an amount corresponding to the angular deviation of said array heading from the direction of the source and a second combiner output signal phase displaced 90° from said first combiner output signal;
   second suppressed carrier modulator means for impressing said second combiner output signal on said other of said quadrature components for providing a second phase displaced modulated component output signal to said resolver means; and
   first and second inverter means each connected to receive a respective one of said first and second phase displaced, modulated component output signals for providing an inverted form of said signal received to said resolver means.

7. Apparatus according to claim 6 further comprising:
   said compass driven resolver means being a goniometer compass connected to receive the output signals of said first and second suppressed modulator means and said first and second inverter means.

8. Apparatus according to claim 7 further comprising;
   data link means for transmitting said multiplexer output signal to points remotely of said sonobuoy surface portion;
   demultiplexer means connected to receive said multiplexer output signal from said data link means for providing a pair of demultiplexer output signals indicative of said omnidirectional hydrophone output signal and displaced in phase a degree corresponding to the angular deviation of the direction of the source from magnetic north; and
   processor means for deriving said demultiplexer output signals a bearing signal indicative of the bearing of the signal source relative to magnetic north.

9. Apparatus according to claim 8 wherein said demultiplexer means further comprises:

forth and fifth modulator means connected to receive said multiplexer output signal for providing output signals;

reference means providing a pair of signals indicative of said quadrature components of said carrier signals to respective ones of said fourth and fifth modulators;

first and second low-pass filter means connected to receive the output signals of said fourth and fifth modulator means for providing said demultiplexer output signals.

10. Apparatus according to claim 9 further comprising:

said multiplexer means including oscillator means providing said carrier signal to said first and second suppressed modulator means;

said multiplexer means further includes means for introducing a plus 90° phase shift into said carrier signal and applying said phase shifted carrier signal to said amplitude modulator;

said reference means of said demultiplexer means further includes voltage controlled oscillator means responsive to a control signal for providing an output signal having the same frequency as said carrier signal to said fifth modulator means;

said reference means of said demultiplexer means further including means for introducing a plus 90° phase shift into said output signal of said voltage controlled oscillator and applying it to said fourth modulator means;

low-pass filter means connected to receive said output signal of said fifth modulator means for extracting and applying the d.c. component of said output signal as said control signal to said voltage controlled oscillator.

* * * * *